Feb. 17, 1931.

L. N. MILLER

JOURNAL BEARING PROTECTOR

Re. 17,972

Original Filed April 28, 1928

2 Sheets-Sheet 1

L. N. Miller
INVENTOR

BY Victor J. Evans
ATTORNEY

Feb. 17, 1931.
L. N. MILLER
JOURNAL BEARING PROTECTOR
Re. 17,972
Original Filed April 28, 1928
2 Sheets-Sheet 2
Fig. 2.
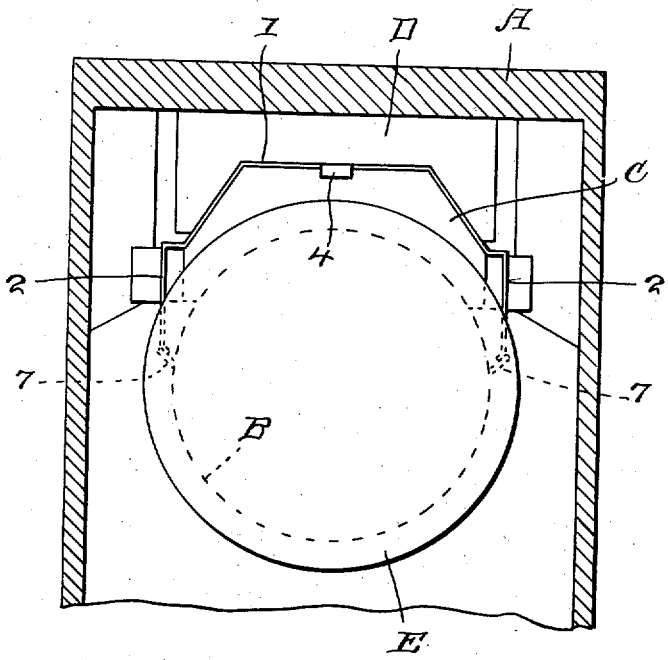
Fig. 4.
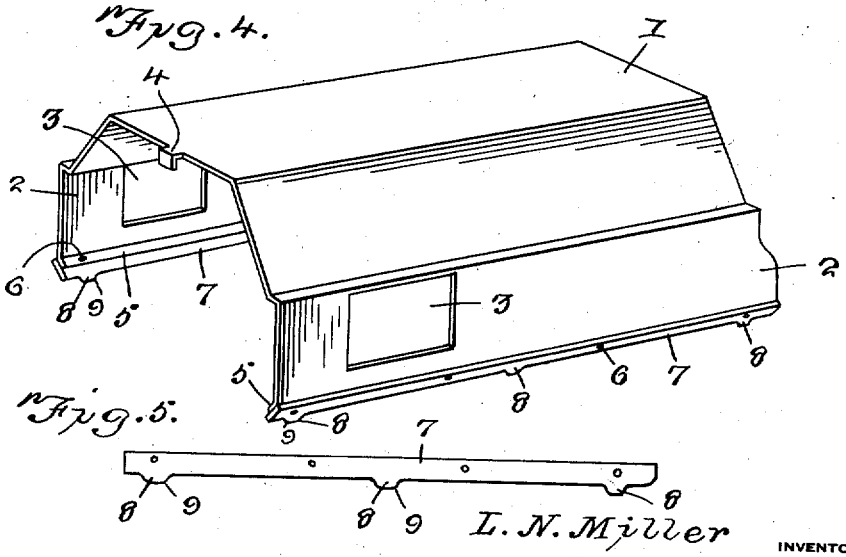
Fig. 5.
L. N. Miller
INVENTOR
BY Victor J. Evans
ATTORNEY Reissued Feb. 17, 1931 Re. 17,972

UNITED STATES PATENT OFFICE

LEWIS N. MILLER, OF ELYRIA, OHIO

JOURNAL-BEARING PROTECTOR

Original No. 1,739,407, dated December 10, 1929, Serial No. 273,631, filed April 28, 1928. Application for reissue filed August 18, 1930. Serial No. 476,200.

This invention relates to journal boxes, and its general object is to provide a journal bearing protector that prevents packing, waste or foreign matter from passing between the axle and bearing, but in no event does it interfere with the passage of oil about the axle or with the proper operation of the parts of the journal box under all working conditions.

A further object of the invention is to provide a protector of the character set forth, that is applicable to the types of journal boxes now generally employed on all railroad cars without change to the boxes or any parts thereof.

Another object of the invention is to provide a journal box protector that can be applied in operative position or removed therefrom in an easy and expeditious manner with very little effort, and is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 2 is a sectional view taken approximately on line 2—2 of Figure 1.

Figure 4 is a perspective view of the protector per se.

Figure 5 is a view of one of the protector strips.

Figure 1:
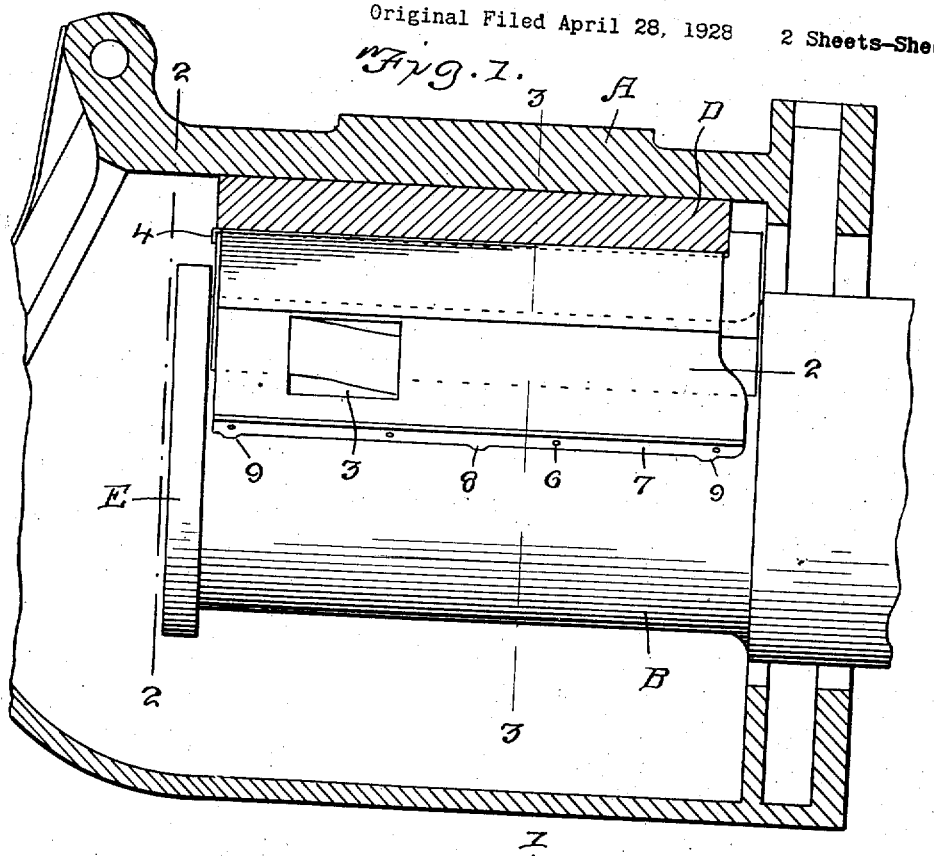
Figure 1 is a vertical sectional view taken through a journal box of the usual construction and showing parts including my protector in side elevation.

Referring to the drawings in detail, the letter A indicates the housing of a journal box of the usual construction, B an axle of a railroad car, C the journal box bearing, D the journal wedge and E the axle collar.

Figure 3:
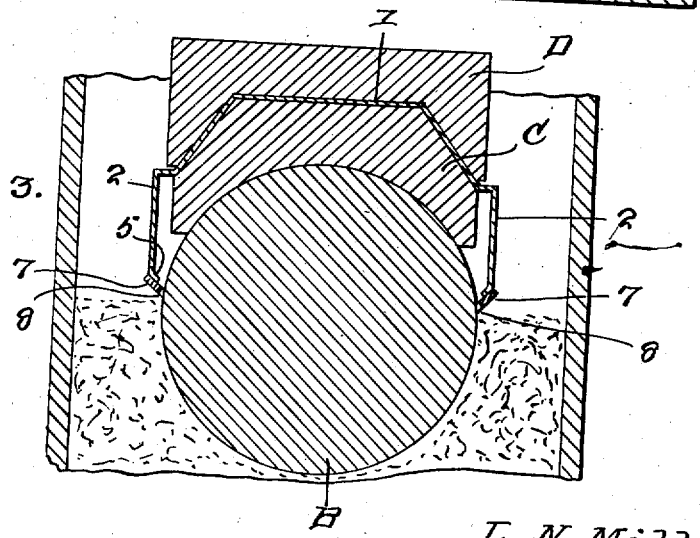
Figure 3 is a sectional view taken approximately on line 3—3 of Figure 1.

The protector which forms the subject matter of the present invention is provided with a body 1 which is preferably formed from sheet metal and has its upper portion formed to follow the shape of the top of the journal bearing C and this upper portion is adapted to be received between the journal bearing and journal wedge as best shown in Figure 3 of the drawings.

Formed with the lower edge of the converging walls of the upper portion, are the side walls 2 of the protector which are provided with substantially rectangular shaped openings 3 to accommodate projections extending laterally from the journal bearing as best shown in Figures 1 and 2 of the drawings. These projections prevent the longitudinal movement of the protector and cooperating therewith is a tongue 4 extending from approximately midway the ends of the forward edge of the upper portion as shown in Figure 4, and this tongue 4 engages the forward end of the journal bearing, while the rearward edge of the upper portion of the protector is disposed in contacting engagement with the flange formed on the inner end of the journal bearing as shown in Figure 1. By this arrangement, it will be obvious that the protector is held against longitudinal movement, and due to its transverse shape which conforms to the shape of the confronting faces of the bearing and wedge, transverse movement of the protector will be prevented, with the result it is practically impossible for the protector to be casually moved from its operative position as shown.

Formed with the side walls at their lower edges is an inwardly inclined flange 5. These flanges 5 are disposed in converging relation with respect to each other and have secured thereto by rivets 6 or other suitable securing means non-metallic strips 7 which have formed therewith adjacent their edges as well as midway the ends thereof projections 8 having rounded corners 9 so as to prevent the protector from catching on the axle collar E when being disposed or removed with respect to the journal box.

The projections 8 are arranged in contacting engagement with the axle and are designed to prevent the passage of waste, packing, or foreign matter about the axle with the result, this material cannot accumulate between the bearing and axle. Notwithstanding the fact that my protector prevents the passage of the material as above set forth, it will not interfere with the proper lubrication of the journal box as it will be apparent that due to the space between the projections 8, oil can freely pass about the axle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

I claim:

1. The combination with a journal box, of a protector for the journal bearing thereof comprising a body formed from sheet metal and including an upper portion shaped to follow the confronting faces of the journal bearing and wedge of said box, side walls included in said body and being disposed in parallelism with respect to each other, a flange for each side wall and the flanges being disposed in converging relation, non-metallic strips secured to said flanges, and projections formed with said strips and being adapted to be disposed in contacting engagement with the axle in the journal box.

2. A journal box bearing protector of the character described comprising a body formed from sheet metal and including an upper portion adapted to be disposed between the journal box bearing and its wedge, means to prevent longitudinal movement of said protector, said upper portion being shaped to conform to the confronting faces of the bearing and wedge to prevent transverse movement of said protector, non-metallic strips secured to said body and projections formed with said strips and having rounded corners.

3. A journal box bearing protector comprising a pair of longitudinally extending strips adapted to engage the axle at each side thereof below the bearing brass, and a metallic frame for supporting the strips, said frame being positioned entirely above the upper portion of the axle and comprising spring arms to which the strips are rigidly attached for holding the strips yieldingly in engagement with the axle.

4. A journal box bearing protector comprising a pair of longitudinally extending non-metallic strips adapted to engage the axle at each side thereof below the bearing brass, and a metallic frame for supporting the strips, said frame being positioned entirely above the upper portion of the axle and comprising spring arms to which the strips are rigidly attached for holding the strips yieldingly in engagement with the axle.

5. A journal box bearing protector comprising a pair of longitudinally extending strips adapted to engage the axle at each side thereof below the bearing brass, the inner edges of said strips being formed to engage the axle at spaced positions longitudinally thereof, and a metallic frame for supporting the strips, said frame being positioned entirely above the upper portion of the axle and comprising spring arms to which the strips are rigidly attached for holding the strips yieldingly in engagement with the axle.

6. A journal box bearing protector comprising a supporting frame formed of sheet metal and including an upper plate portion adapted to be clamped between the bearing brass and the wedge and having a vertically extending flange at one end to prevent longitudinal movement of the frame, the frame having side portions extending downwardly and inwardly at the sides of the axle, and longitudinally extending guard strips rigidly secured to and supported by the side portions of the frame and engaging the opposite sides of the axle.

7. A journal box bearing protector comprising a supporting frame formed of sheet metal and including an upper plate portion adapted to be clamped between the bearing brass and the wedge and having a vertically extending flange at one end to prevent longitudinal movement of the frame, the frame having side portions extending downwardly and inwardly at the sides of the axle, and longitudinally extending guard strips rigidly secured to and supported by the side portions of the frame and shaped at their inner edges to engage the sides of the axle at a plurality of spaced positions longitudinally thereof.

8. A journal box bearing protector comprising a body formed from sheet metal and including an upper portion adapted to be disposed between the journal box bearing and its wedge, and downwardly extending side portions terminating in downwardly and inwardly extending flanges, and non-metallic strips secured to these flanges in position to engage the respective sides of the axle.

9. A journal box bearing protector comprising a body formed from sheet metal and including an upper portion adapted to be disposed between the journal box bearing and its wedge, and downwardly extending side portions terminating in downwardly and inwardly extending flanges, and non-metallic strips rigidly secured to these flanges in position to engage the respective sides of the axle.

10. A journal box bearing protector comprising a body formed from sheet metal and including an upper portion adapted to be disposed between the journal box bearing and its wedge, and downwardly extending side portions terminating in downwardly and inwardly extending flanges, and guard strips rigidly secured to these flanges in position to engage the respective sides of the axle.

11. A journal box bearing protector comprising a body portion formed from sheet metal and including an upper transversely extending portion formed to be held in place above the bearing brass, and downwardly extending side-portions terminating in downwardly and inwardly extending flanges, and guard strips rigidly secured to these flanges in position to engage the respective sides of the axle.

12. A journal box bearing protector comprising a body portion formed from sheet metal and including an upper transversely extending portion formed to be held in place above the bearing brass, and side portions extending downwardly at the respective sides of the axle and terminating in longitudinally extending substantially rigid guard strips engaging the respective sides of the axle.

13. A journal box bearing protector comprising a body portion formed from sheet metal and including an upper transversely extending portion formed to be held in place above the bearing brass, and side portions extending downwardly at the respective sides of the axle and terminating in longitudinally extending substantially rigid non-metallic guard strips engaging the respective sides of the axle.

14. A journal box bearing protector comprising a body portion formed from sheet metal and including an upper transversely extending portion formed to be held in place above the bearing brass, and side portions extending downwardly at the respective sides of the axle and terminating in longitudinally extending substantially rigid guard strips having spaced apart projecting portions adapted to engage the respective sides of the axle.

15. A journal box bearing protector comprising a body formed from sheet metal and including an upper portion adapted to be disposed between the journal box bearing and its wedge, and downwardly extending side portions terminating in downwardly and inwardly extending flanges and guard strips rigidly secured to these flanges in position to engage the respective sides of the axle, the strips having spaced apart projecting portions adapted to engage the respective sides of the axle.

16. A journal box bearing protector comprising a body formed from sheet metal and including an upper portion adapted to be disposed between the journal box bearing and its wedge, and downwardly extending side portions terminating in downwardly and inwardly extending flanges and guard strips secured to these flanges in position to engage the respective sides of the axle, the strips having spaced apart projecting portions adapted to engage the respective sides of the axle, said strips being formed of a rigid non-metallic material.

LEWIS N. MILLER.